United States Patent
Hilbert et al.

(10) Patent No.: US 9,721,427 B2
(45) Date of Patent: Aug. 1, 2017

(54) SYSTEM AND METHOD FOR POSITIONALLY ACCURATE GAMING CONTENT

(71) Applicant: Bally Gaming, Inc., Las Vegas, NV (US)

(72) Inventors: Scott Thomas Hilbert, Sparks, NV (US); Joseph Randolph Hedrick, Reno, NV (US); Nicole Marie Beaulieu, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 246 days.

(21) Appl. No.: 14/494,441

(22) Filed: Sep. 23, 2014

(65) Prior Publication Data
US 2016/0086442 A1   Mar. 24, 2016

(51) Int. Cl.
*A63F 9/00* (2006.01)
*G07F 17/32* (2006.01)
(Continued)

(52) U.S. Cl.
CPC ...... *G07F 17/3239* (2013.01); *G06F 3/04817* (2013.01); *G06F 3/04842* (2013.01); *G07F 17/322* (2013.01); *G07F 17/323* (2013.01); *G07F 17/3206* (2013.01); *G07F 17/3211* (2013.01); *G07F 17/3218* (2013.01);
(Continued)

(58) Field of Classification Search
None
See application file for complete search history.

(56) References Cited

U.S. PATENT DOCUMENTS 5,618,232 A    4/1997   Martin
5,830,069 A    11/1998  Soltesz et al.
(Continued)

FOREIGN PATENT DOCUMENTS

WO    01/36527       5/2001
WO    2007/079395    7/2007

*Primary Examiner* — Seng H Lim
(74) *Attorney, Agent, or Firm* — Seed IP Law Group LLP

(57) ABSTRACT

A system is disclosed for providing access to first interactive content or second interactive content by a user of a portable computing device based upon a determined location of the portable computing device. The system includes a host server, a content server storing data representing the first interactive content and the second interactive content, and a communication network in communication with the host server and the content server. One or more WiFi communication beacons are in communication with the host server through the communication network. The communication network is configured to establish communication with the portable computing device. The host server is configured to determine a location of the portable computing device from the communication of the portable computing device with the communication network using a combination of WiFi signals and Bluetooth signals. The host server configured to control the content server and enable the portable computing device to display the first interactive content when the portable computing device is determined to be in a first location and to display the second interactive content when the portable computing device is determined to be in a second location.

22 Claims, 12 Drawing Sheets

(51) Int. Cl.
  *H04L 29/08* (2006.01)
  *H04W 4/04* (2009.01)
  *H04W 4/20* (2009.01)
  *H04L 29/06* (2006.01)
  *G06F 3/0481* (2013.01)
  *G06F 3/0484* (2013.01)
(52) U.S. Cl.
  CPC ...... *G07F 17/3223* (2013.01); *G07F 17/3272* (2013.01); *H04L 67/1095* (2013.01); *H04L 67/38* (2013.01); *H04W 4/04* (2013.01); *H04W 4/206* (2013.01)

(56) References Cited

U.S. PATENT DOCUMENTS

| | | | |
|---|---|---|---|
| 7,510,474 B2 * | 3/2009 | Carter, Sr. | G07F 17/32 463/16 |
| 7,828,654 B2 | 11/2010 | Carter, Sr. | |
| 8,684,830 B1 * | 4/2014 | Chun | G07F 17/322 463/25 |
| 8,727,892 B1 * | 5/2014 | Chun | G07F 17/3276 463/25 |
| 8,808,077 B1 * | 8/2014 | Chun | G07F 17/3293 463/11 |
| 8,870,649 B2 | 10/2014 | Carter, Sr. | |
| 9,039,508 B1 * | 5/2015 | Arnone | G07F 17/3227 463/16 |
| 2007/0155489 A1 | 7/2007 | Beckley et al. | |
| 2008/0108401 A1 * | 5/2008 | Baerlocher | G07F 17/3272 463/12 |
| 2008/0108404 A1 * | 5/2008 | Iddings | G07F 17/32 463/16 |
| 2008/0234047 A1 * | 9/2008 | Nguyen | G07F 17/32 463/42 |
| 2010/0069144 A1 * | 3/2010 | Curtis | G07F 17/32 463/25 |
| 2010/0130280 A1 * | 5/2010 | Arezina | G07F 17/3206 463/20 |
| 2011/0092271 A1 * | 4/2011 | Nguyen | G07F 17/3244 463/25 |
| 2012/0294231 A1 * | 11/2012 | Finlow-Bates | H04W 48/14 370/328 |
| 2014/0094238 A1 * | 4/2014 | Huxley | G07F 17/322 463/12 |
| 2014/0334463 A1 * | 11/2014 | Lipman | G01S 5/14 370/338 |
| 2014/0378219 A1 * | 12/2014 | Arnone | G07F 17/3227 463/29 |
| 2015/0133223 A1 | 5/2015 | Carter | |
| 2015/0148119 A1 * | 5/2015 | Arnone | G07F 17/3227 463/25 |
| 2015/0148122 A1 * | 5/2015 | Arnone | G07F 17/3227 463/29 |
| 2015/0254928 A1 * | 9/2015 | Arnone | G07F 17/3227 463/25 |

* cited by examiner

SYSTEM AND METHOD FOR POSITIONALLY ACCURATE GAMING CONTENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure relates to systems and methods of determining the location of a user's portable device and, more specifically, systems and methods of determining the location of a user's portable device and providing tailored interactive content based on the determined location.

BACKGROUND

Previously, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting.

There is a desire to use mobile devices such as smart phones as gaming devices, although there remains the problem that these mobile devices do not have access to traditional gaming peripherals. It would be desirable to allow mobile devices to participate in playing games with real money in a casino environment, leveraging existing infrastructure in a way that makes sense to a player.

While gaming machines including feature games have been successful, there remains a need for feature games that provide players with enhanced excitement and an increased opportunity of winning

SUMMARY

Briefly, and in general terms, disclosed herein is a system for providing access to first interactive content or second interactive content by a user of a portable computing device based upon a determined location of the portable computing device. The system includes a host server, a content server storing data representing the first interactive content and the second interactive content, and a communication network in communication with the host server and the content server. One or more WiFi communication beacons are in communication with the host server through the communication network. The communication network is configured to establish communication with the portable computing device. The host server is configured to determine a location of the portable computing device from the communication of the portable computing device with the communication network using WiFi signals. The host server configured to control the content server and enable the portable computing device to display the first interactive content when the portable computing device is determined to be in a first location and to display the second interactive content when the portable computing device is determined to be in a second location.

In another embodiment, the system enables the portable computing device (instead of the host server) to determine its location by monitoring WiFi and other wireless signals then displaying appropriate content from locally stored content. In such an embodiment, a network connection or back end server/service is not required for the portable computing device to determine its location. The communications/wireless signal may be WiFi, Bluetooth, zigbee, or any wireless signal (or combinations thereof) from which a signal can be received and a signal strength determined.

In still another embodiment, a method is disclosed of delivering at least first interactive content and second interactive content to a portable computing device based upon a location of the portable computing device, the portable computing device including communication functionality. The method includes: transmitting communication beacon signals from a plurality of beacons; establishing communication between the portable computing device and the plurality of beacons using the transmitted communication beacon signals; by using WiFi signals, Bluetooth signals, other wireless signals, or combinations thereof, deriving from the communication, using a processor, a location of the portable computing device within one of a first location having first demographic characteristics and a second location having second demographic characteristics; and configuring a server for providing to said portable device said first interactive content when the portable device is determined to be in said first location and said second interactive content when said portable device is determined to be in said second location.

Notably, in yet other embodiments, the content server additionally stores data representing the third interactive content, forth interactive content, fifth interactive content, . . . Nth interactive content, and wherein the portable computing device displays corresponding interactive content when the portable computing device is determined to be in a third location, forth location, fifth location, . . . Nth location, respectively.

The disclosed embodiments further relates to machine readable media on which are stored embodiments of the disclosed invention described in herein. It is contemplated that any media suitable for retrieving instructions is within the scope of the disclosed embodiments. By way of example, such media may take the form of magnetic, optical, or semiconductor media. The invention also relates to data structures that contain embodiments of the disclosed invention, and to the transmission of data structures containing embodiments of the disclosed invention.

Further advantages of the disclosed embodiments will be brought out in the following portions of the specification, wherein the detailed description is for the purpose of fully disclosing the various embodiments without placing limitations thereon.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1:
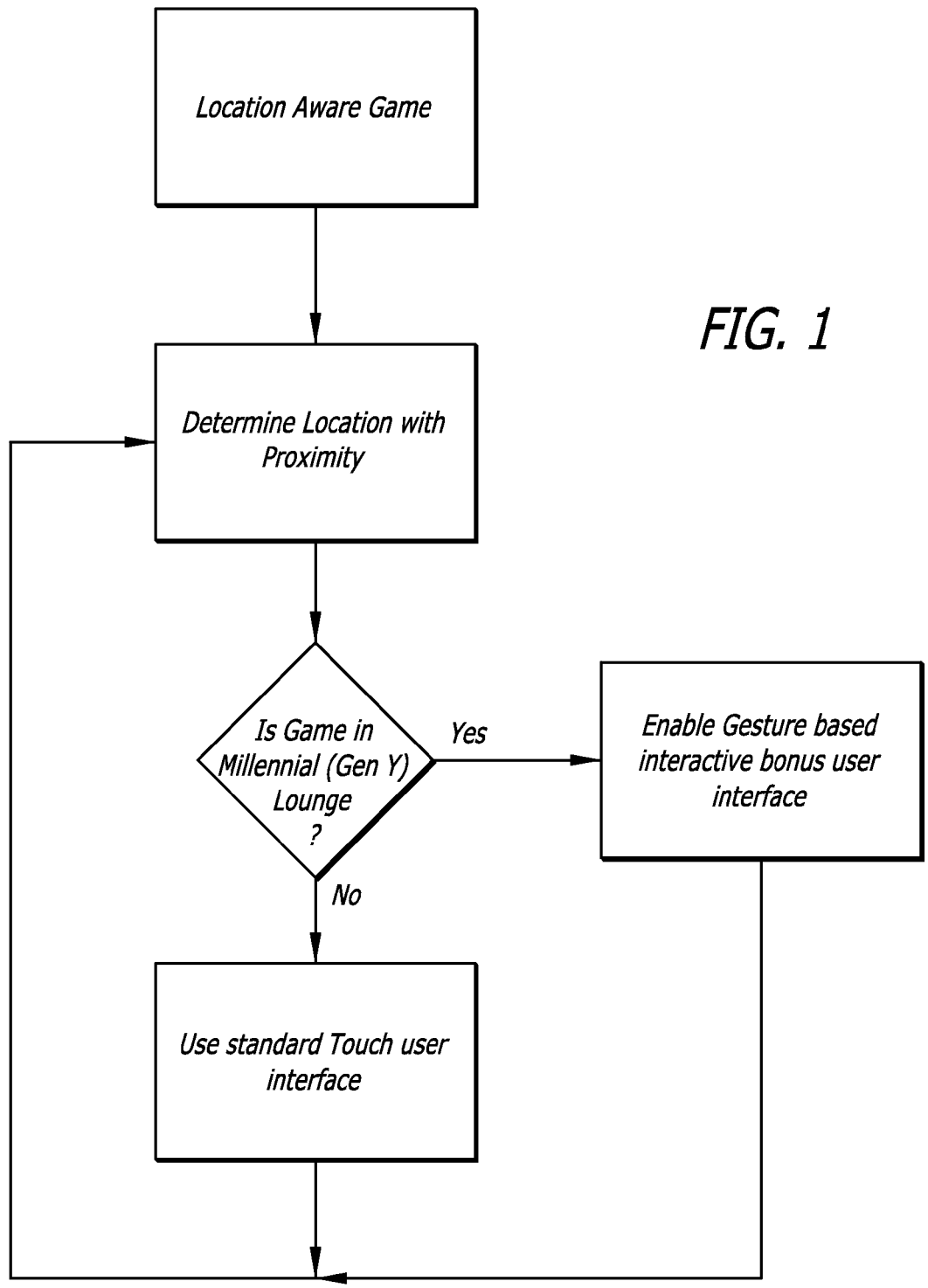
FIG. 1 illustrates a logic diagram of a system for providing geographically tailored gaming content.
Figure 2:
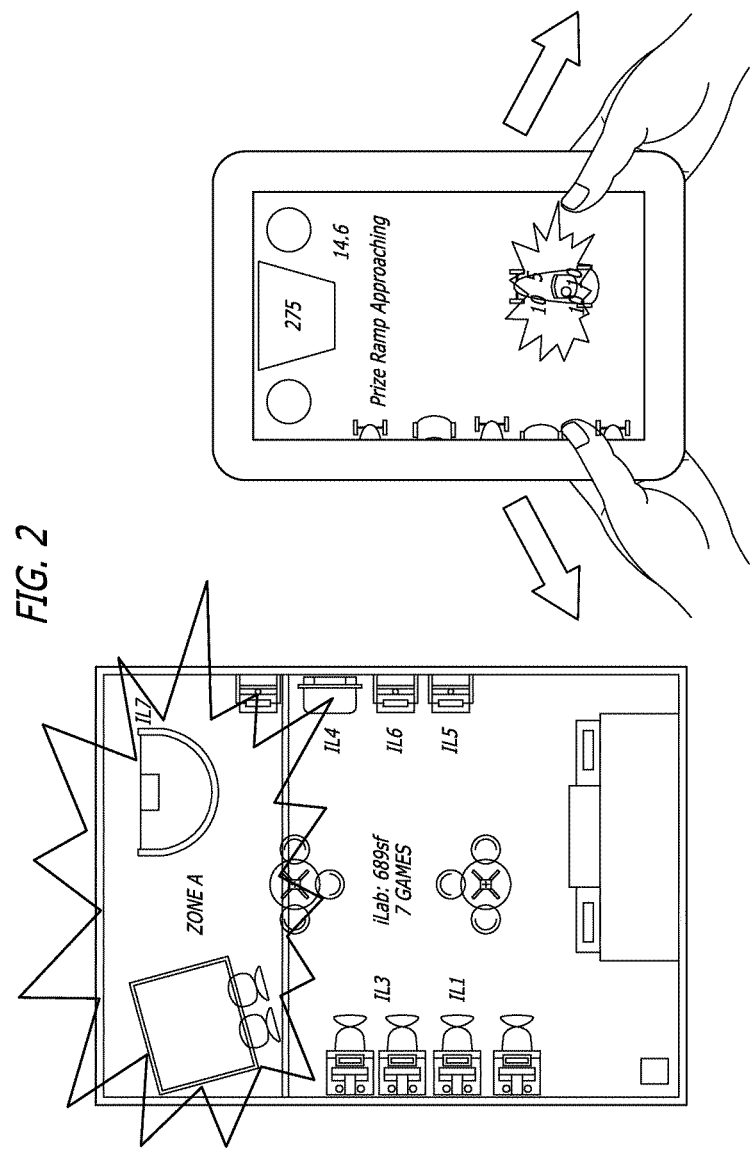
FIG. 2 illustrates a layout view of a game floor and a front view of a portable gaming device is located within Zone A of the displayed game floor.
Figure 3:
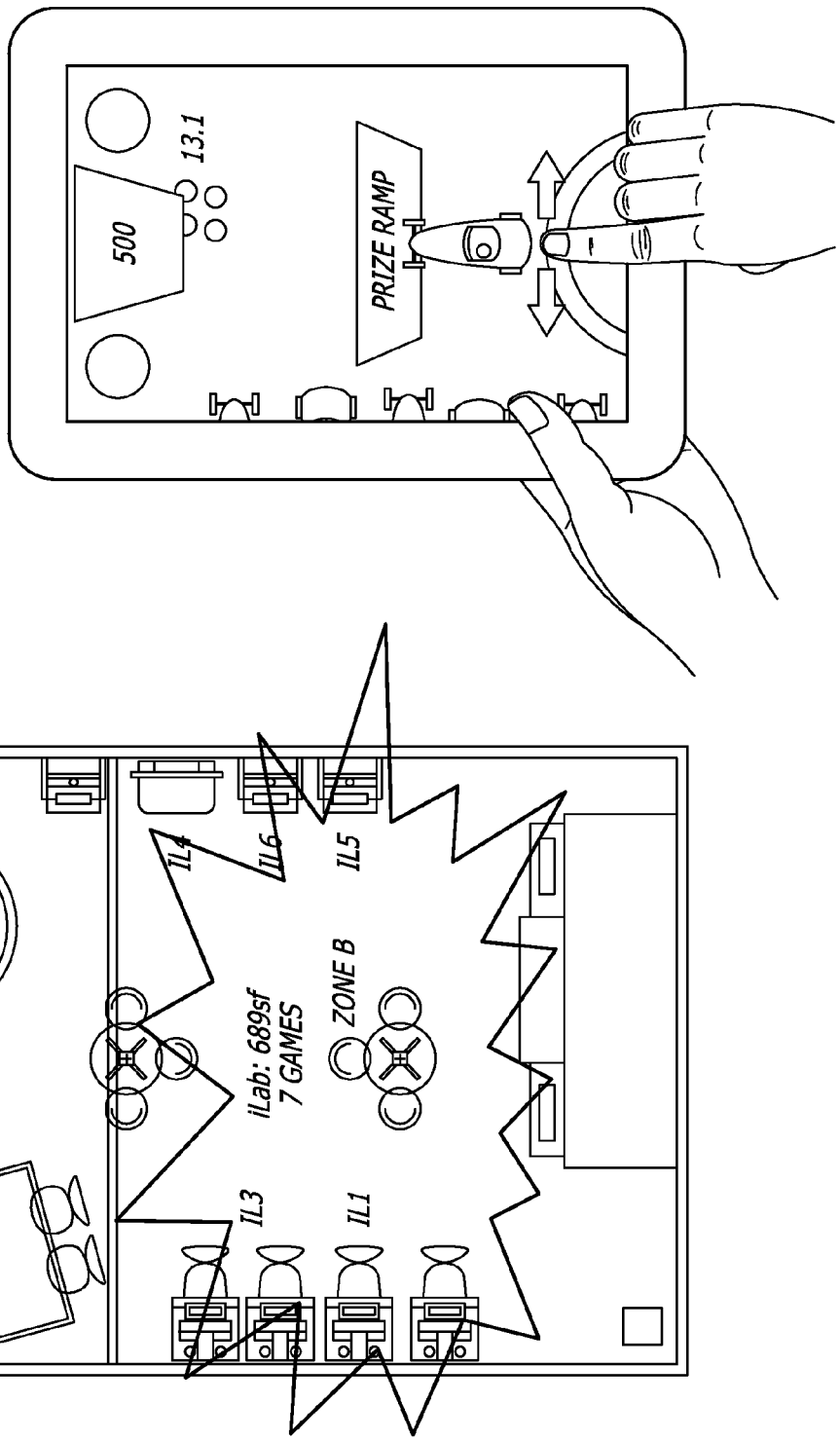
FIG. 3 illustrates a layout view of a game floor and a front view of a portable gaming device is located within Zone B of the displayed game floor.
Figure 4:
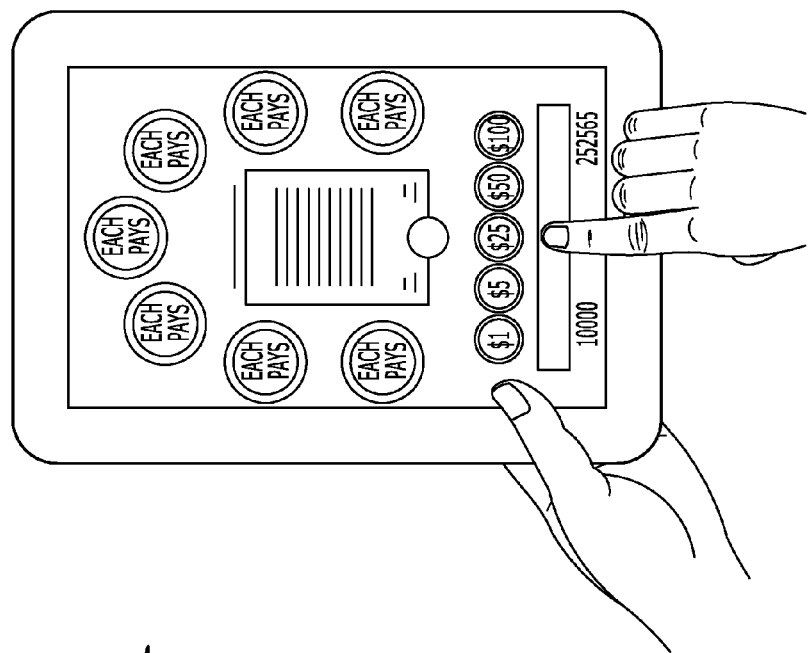
FIG. 4 illustrates a layout view of a game floor with a shared electronic table game and a front view of a portable gaming device is located within Zone A of the displayed game floor.
Figure 4:
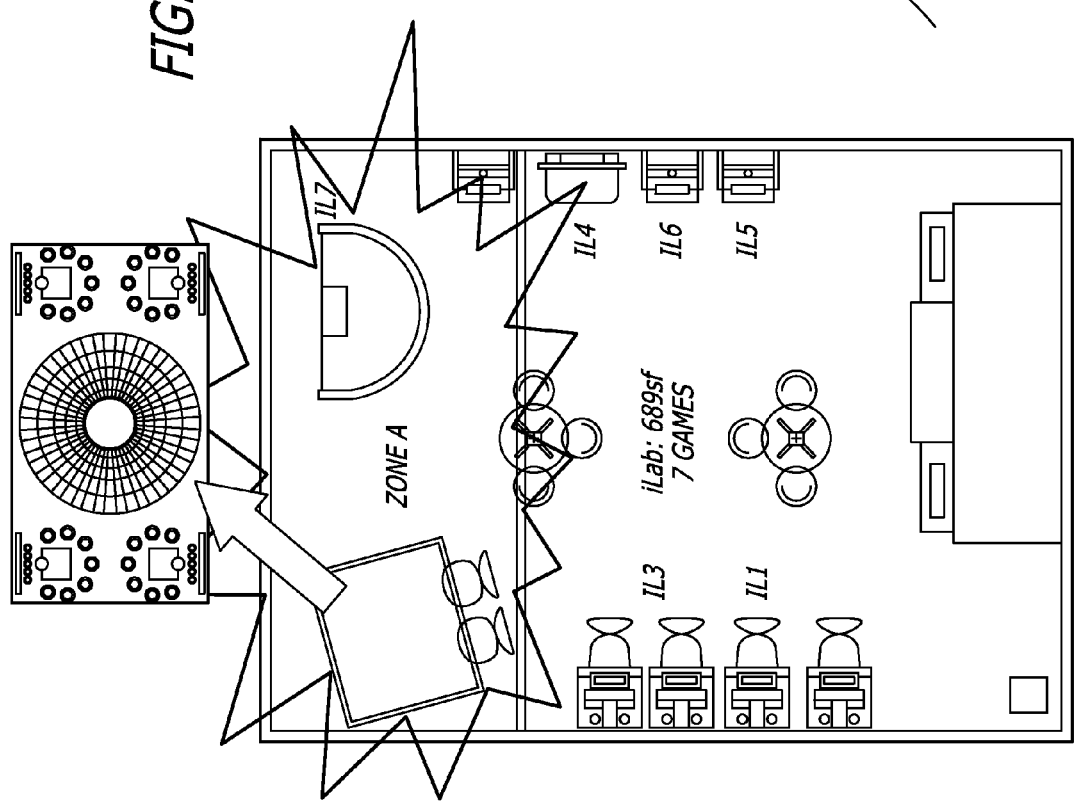
Figure 5:
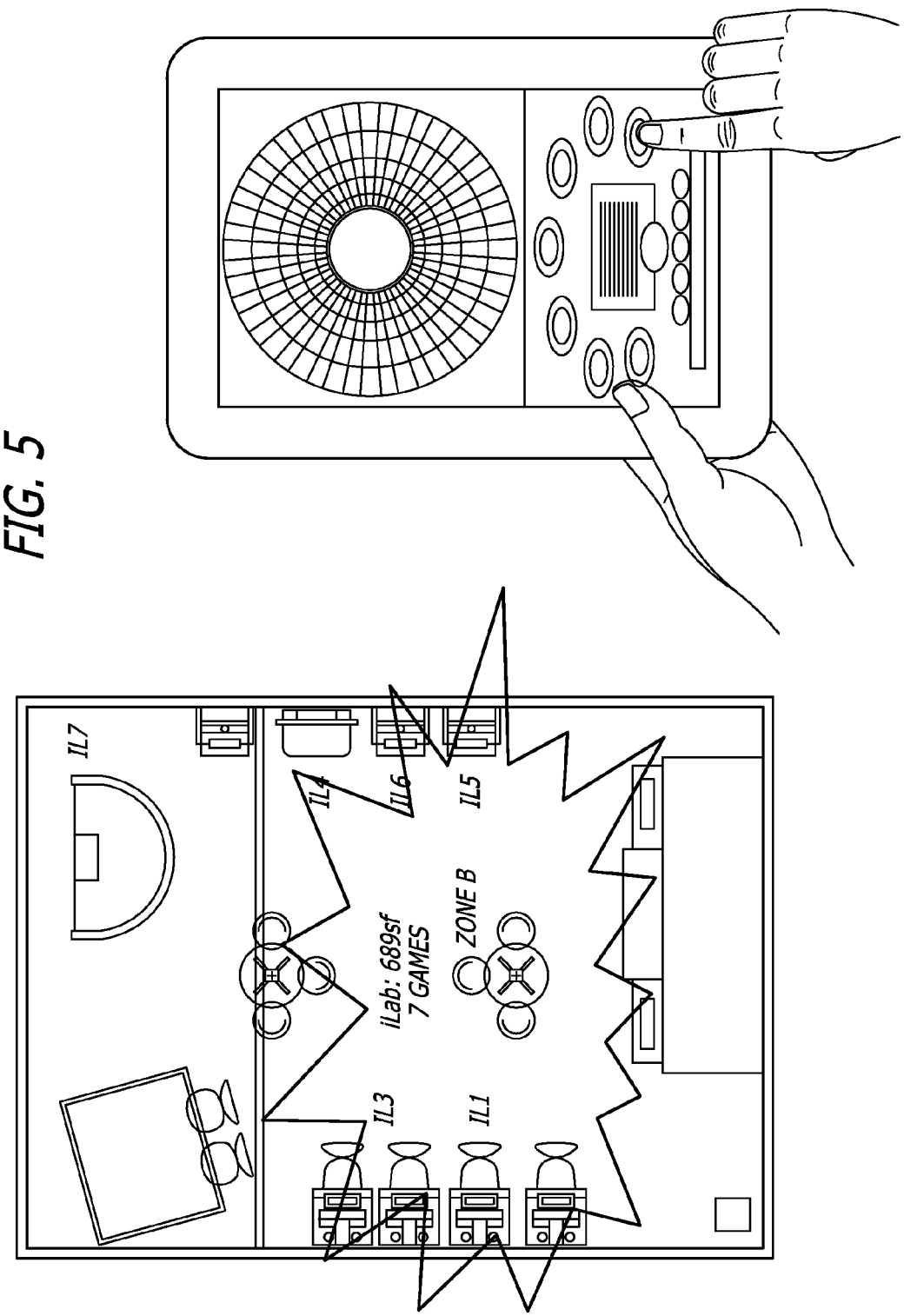
FIG. 5 illustrates a layout view of a game floor with a shared electronic table game and a front view of a portable gaming device is located within Zone B of the displayed game floor.

Persons of ordinary skill in the art will understand that the present disclosure is illustrative only and not in any way limiting. Other embodiments of the presently disclosed system and method readily suggest themselves to such skilled persons having the benefit of this disclosure.

Each of the features and teachings disclosed herein can be utilized separately or in conjunction with other features and teachings to provide a system and method to provide user-configurable rules for team play on a single gaming machine. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "configuring," "determining," "displaying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIGS. 1-5 illustrate various embodiments of the disclosed system and method for geographically tailored gaming content that determines the location of a user's portable device based upon criteria associated with the determined location to provide tailored interactive content, such as game content. Also disclosed are systems and methods for geographically tailored gaming content that relate to a gaming device, such as an electronic gaming table, where based upon the determined location of a player's portable device, the device will display only a game player interface or will display the interface with images of the game.

Some embodiments of the system and method for geographically tailored gaming content leverage employ location awareness technology to deliver game experiences that are tailored to a specific location. For example, specific areas of a casino property may include gaming floor, bars, restaurants and shops. In the disclosed embodiments, location awareness technology enables interactive content (e.g., a wagering game) on mobile computing devices to acquire information about the devices geographic location. This geographic location information may then be used by the mobile computing device game to generate unique gaming experiences based on location, e.g., position on the game floor.

In one embodiment, the system and method for geographically tailored gaming content uses multiple technologies to determine the location of a mobile computing device. In one aspect of the geographically tailored gaming content system, cellular tower positioning is used for achieving positional accurate location. Where accessible (primarily outdoors), GPS signals may be used. In another aspect of the geographically tailored gaming content system, more accurate positional approximation within a casino property is achieved using WiFi signal strength from access points. In still another aspect of the geographically tailored gaming content system, Bluetooth 4.0 standard (Bluetooth Low Energy BLE/Bluetooth Smart; short-wavelength UHF radio waves in the ISM band from 2.4 to 2.485 GHz) technology is used to augment the above-mentioned positioning technologies. However, in other embodiments, other wireless signals and/or protocols are implemented to determine locations. For example, 5 GHz location beacons with another encoding protocol may be used.

By using WiFi in combination with Bluetooth, the geographically tailored gaming content system can achieve approximately one to two meter accuracy. This level of accuracy is sufficient to locate a player/mobile computing device within a specific region of the property. In one embodiment of the geographically tailored gaming content system, locations are specific areas of a casino property such as gaming floor, bars, restaurants and shops. By identifying when a player/mobile computing device is in a specific location, the game play can be modified to provide a different bonus event to the player.

In some embodiments of the geographically tailored gaming content system, locations may also be determined by several additional methods as well. In one embodiment, trilateration is implemented by the geographically tailored gaming content system, which uses the Received Signal Strength Indication (RSSI) measured by the mobile computing device's receiver. This technique examines the RSSI of multiple radios to determine a relative position of a mobile computing device. In some embodiments, the geographically tailored gaming content system uses the "proximity" technique (nearest neighbor), which scans for the strongest signal strength, and determines a mobile computing device's position based on the RSSI and fixed geographic location of the transmitting device.

In one example implementation of the geographically tailored gaming content system, two unique player interaction methods are delivered to a player as a game bonus based on the player's present location. In this example implementation, a U-Drive bonus mechanism provides the first unique player interaction method, e.g., a traditional touch screen interaction to a bonus event for player on the main gaming area. Continuing in this example implementation, the second unique player interaction method enables players to provide "pitch," "roll," and "yaw" input through their mobile computing device. These "pitch," "roll," and "yaw" input capabilities are designed to appeal to a younger, more tech-savvy group of players. The geographically tailored gaming content system uses location awareness technology to change the bonus interaction to one that enables players to "pitch," "roll," and "yaw" their mobile computing device to steer in a bonus round.

The more tech-savvy group of players would be identified by location, such as a club or Gen-Y centric lounge on property. In developing a game with multiple experiences, a single game development may be targeted at two distinct player demographics and provide a unique experiences to each distinct player demographic that is more in line with their expectations of gaming interactions.

Another example implementation of the geographically tailored gaming content system is the shared table wagering experience. In this example implementation, multiple players (e.g., four players) are seated at a common display and wager on a game event. This is similar to electronic table game (ETG) roulette, but with all players sharing a common single large display. By using the geographically tailored gaming content system, players not seated at the game table are also able to play and wager on the same game being played on the game table via their mobile computing devices.

For players in the vicinity of the electronic shared table, an auxiliary large overhead display shows the game on the main table. Players not at the table may use an application, associated with geographically tailored gaming content system, on their mobile computing device to wager on the table game event. The location awareness from the geographically tailored gaming content system enables the mobile wagering experience to be tailored to the remote player's location. Without the geographically tailored gaming content system, players need to be in visual sight of the secondary display to see the game outcome. With geographically tailored gaming content system, remote players beyond the visual sight of the secondary display and still play the game.

In another aspect of the geographically tailored gaming content system, a player's mobile interface is optimized to show a wagering interface if the player is in visual sight of the overhead game display (i.e., same room), since the game outcome is visible within their current location. This feature enables the wagering interface to be graphically represented for best usability on a mobile screen since there is no need to occupy screen area showing the table game screen. In this manner, a player who is not in the same room as the shared table game may still wager on the same game, but their mobile experience would display a representation of the table game (as well as the ability to launch or enlarge a wagering interface). This type of adaptive game interface that is presented by the geographically tailored gaming content system is a unique way of using location awareness to tailor interactive gaming content.

The two above example implementations of the geographically tailored gaming content system were focused on casino property applications. In other embodiments of the geographically tailored gaming content system, the system may be extended to wagering off property. In one such embodiment of the geographically tailored gaming content system, wagering games are offered in jurisdictions where mobile wagering is legal, but when the mobile computing device is outside of a geo-fenced approved area for wagering, the players are provided with a "play for free" (non-gambling) version of the same game. In still other embodiments of the geographically tailored gaming content system, entertainment/amusement games are offered in a first geographical area, but when the mobile computing device is outside of the first geographical area (e.g., using geo-fencing technology), the players are provided with different interactive content (e.g., a different versions of the entertainment/amusement games, different game entertainment/amusement titles, and the like).

Yet another embodiment of the geographically tailored gaming content system is configured for use with multi-state lotteries. In such an embodiment, the geographically tailored gaming content system employs a mobile application that enables players to purchase lottery tickets via a mobile computing device from their current location. For example, using the geographically tailored gaming content system within the geographical boundaries of New York state, users of the system may purchase New York state lottery tickets but when crossing into the geographical boundaries of Pennsylvania state, the mobile application automatically converts to enabling the purchase of Pennsylvania state lottery tickets.

Continuing, in another embodiment of the geographically tailored gaming content system, player's club information is tied into the system to enable the identifying of players that are returning to specific areas and playing the same game again. In this embodiment of the geographically tailored gaming content system, when a previous player returns and plays the same game on the same gaming machine, this return game play unlocks new options, levels, or features. Additionally, in this embodiment of the geographically tailored gaming content system, some games require players to traverse areas of the casino property to unlock different features, levels, points, or combinations thereof.

Another implementation of the geographically tailored gaming content system is for the insertion of Casino branded content. In some embodiments, corporate casino operators use the geographically tailored gaming content system and location rules to control the insertion of adaptive content that is unique to the casino operators' brand.

Still another implementation of the geographically tailored gaming content system is for geographic theming of games. In one such embodiment of the geographically tailored gaming content system, geographically tailored games have a different visual appearance for an East Coast market than they do for a Las Vegas or West Coast property. In yet another implementation of the geographically tailored gaming content system, language preferences for the content are determined using geo-location such that the primary language in a geographic region is automatically selected. Continuing, in another implementation of the geographically tailored gaming content system, game pay tables or available denomination are adjusted based on the location of the mobile computing device within a casino property. In other embodiments, other geographically tailored gaming content includes regional/location specific sounds, graphics, languages, events, paybacks, interactions, and combinations thereof The geographically tailored gaming content system leverages multiple radio receivers that are integrated into modern mobile computing devices (e.g., smart phones, tablets, and the like). Simple coarse location position may be determined by cell tower localization. More accurate positional information may be obtained using the WiFi and Bluetooth radio signals of the mobile computing device. Within a casino property, a significant number of WiFi access points typically exist, and with their fixed locations, more accurate mobile computing device location can be determined using RSSI and Trilateration or proximity techniques. To further improve accuracy, Bluetooth battery powered Beacons may be placed at various locations to provide more granular locational signals. The use of both technologies enables positional accuracy in the range of one to two meters.

When using the geographically tailored gaming content system, the system enables games or applications on a mobile computing device to monitor the signal strength from known WiFi Access points and BLE Beacons. By using this location information and comparing the location information to a local or network/cloud data base of Access/Beacon locations, the system enables the mobile computing devices to determine a relative geographical position of a mobile computing device within a property.

Accordingly, by leveraging the geographically tailored gaming content system, the game logic of an application or a server/cloud based system may alter user presented content or interfaces relative to the mobile computing device's position. Such game logic may be in the form of permissions or game outcome percentages. Continuing, the geographically tailored gaming content system leverage the increased computing power and hardware integration of mobile computing devices to provide tailored user experiences based on location.

In some embodiments, the geographically tailored gaming content system enables geographically-tailorable games to adapt various types of positional game logic, thereby enabling unique gaming experiences based on the player's location. The geographically tailored gaming content system may be implemented both macroscopically (e.g., large geo-fence boundaries, state borders, and the like) or microscopically (casino property, small discreet areas, and the like) to provide a single geographically-tailorable game that can suit demographic or jurisdictional differences with a single build.

Figure 6:
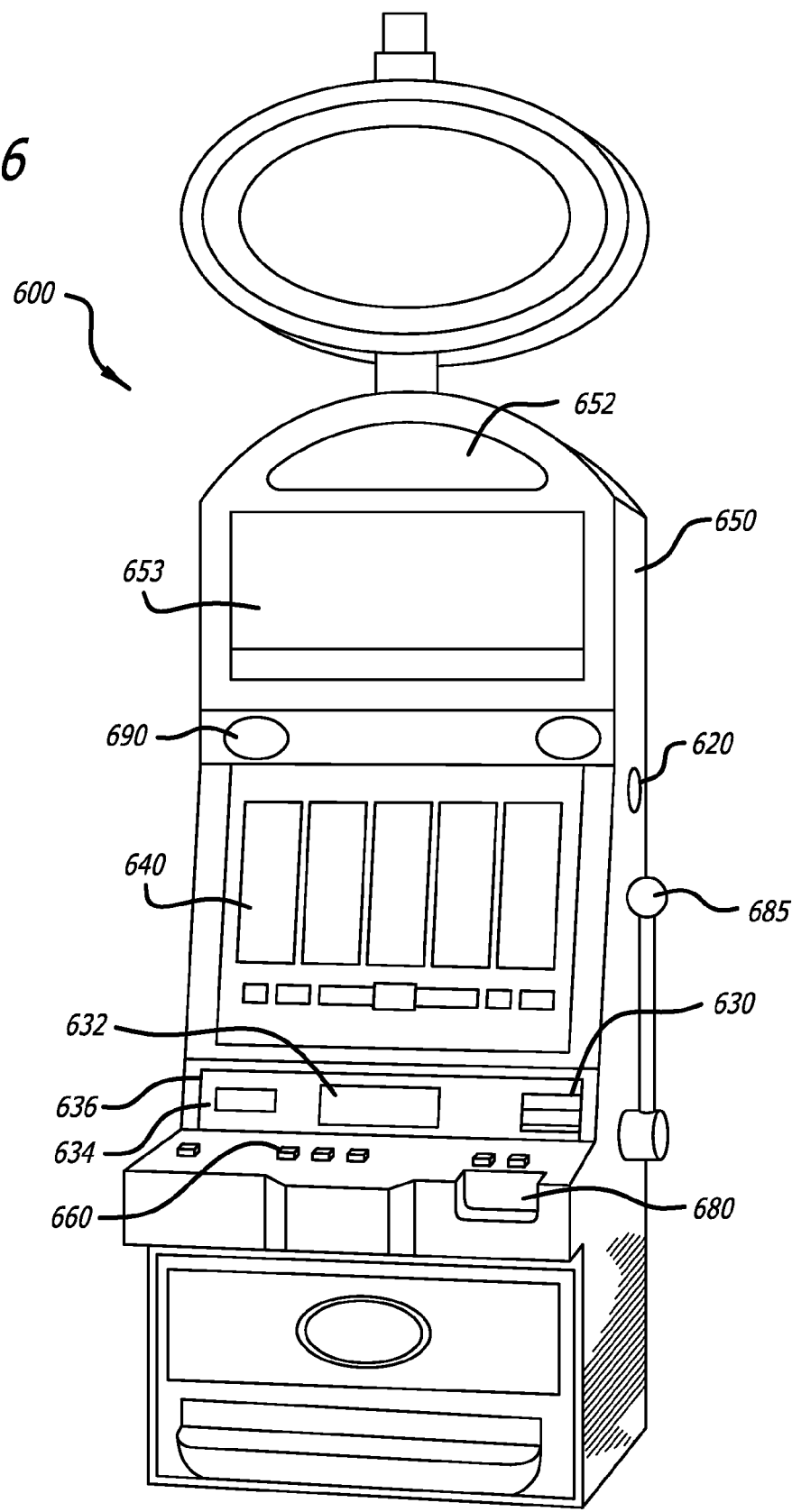
FIG. 6 illustrates a perspective view of a gaming machine in accordance with one or more embodiments.

Referring to FIG. 6, gaming machine 600 is capable of supporting various embodiments, including cabinet housing 620, primary game display 640 upon which a primary game and feature game may be displayed, top box 650 which may display multiple progressives that may be won during play of the feature game, player-activated buttons 660, player tracking panel 636, bill/voucher acceptor 680 and one or more speakers 690. Cabinet housing 620 may be a self-standing unit that is generally rectangular in shape and may be manufactured with reinforced steel or other rigid materials which are resistant to tampering and vandalism. Cabinet housing 620 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 600 or thin client capability such as that incorporating some of the capability of a remote server.

In one or more embodiments, cabinet housing 620 houses a processor, circuitry, and software (not shown) for receiving signals from the player-activated buttons 660, operating the games, and transmitting signals to the respective displays and speakers. Any shaped cabinet may be implemented with any embodiment of gaming machine 600 so long as it provides access to a player for playing a game. For example, cabinet 620 may comprise a slant-top, bar-top, or table-top style cabinet, including a Bally Cinevision™ or CineReels™ cabinet. The operation of gaming machine 600 is described more fully below.

The plurality of player-activated buttons 660 may be used for various functions such as, but not limited to, selecting a wager denomination, selecting a game to be played, selecting a wager amount per game, initiating a game, or cashing out money from gaming machine 600. Buttons 660 may be operable as input mechanisms and may include mechanical buttons, electromechanical buttons or touch screen buttons. Optionally, a handle 685 may be rotated by a player to initiate a game.

In one or more embodiments, buttons 660 may be replaced with various other input mechanisms known in the art such as, but not limited to, a touch screen system, touch pad, trackball, mouse, switches, toggle switches, or other input means used to accept player input such as a Bally iDeck™. One other example input means is a universal button module as disclosed in U.S. Patent Publication No. 20060247047, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 620 may optionally include top box 650 which contains "top glass" 652 comprising advertising or payout information related to the game or games available on gaming machine 600. Player tracking panel 636 includes player tracking card reader 634 and player tracking display 632. Voucher printer 630 may be integrated into player tracking panel 636 or installed elsewhere in cabinet housing 620 or top box 650.

Game display 640 may present a game of chance wherein a player receives one or more outcomes from a set of potential outcomes. For example, one such game of chance is a video slot machine game. In other aspects of the invention, gaming machine 600 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 640 is, typically, a CRT or a flat-panel display in the form of, but not limited to, liquid crystal, plasma, electroluminescent, vacuum fluorescent, field emission, or any other type of panel display known or developed in the art. Game display 640 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 640 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 640 may also present information such as, but not limited to, player information, advertisements and casino promotions, graphic displays, news and sports updates, or even offer an alternate game. This information may be generated through a host computer networked with gaming machine 600 on its own initiative or it may be obtained by request of the player using either one or more of the plurality of player-activated buttons 660; the game display itself, if game display 640 comprises a touch screen or similar technology; buttons (not shown) mounted about game display 640 which may permit selections such as those found on an ATM machine, where legends on the screen are associated with respective selecting buttons; or any player input device that offers the required functionality.

Cabinet housing 620 incorporates a single game display 640. However, in alternate embodiments, cabinet housing 620 or top box 650 may house one or more additional displays 653 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 7A:
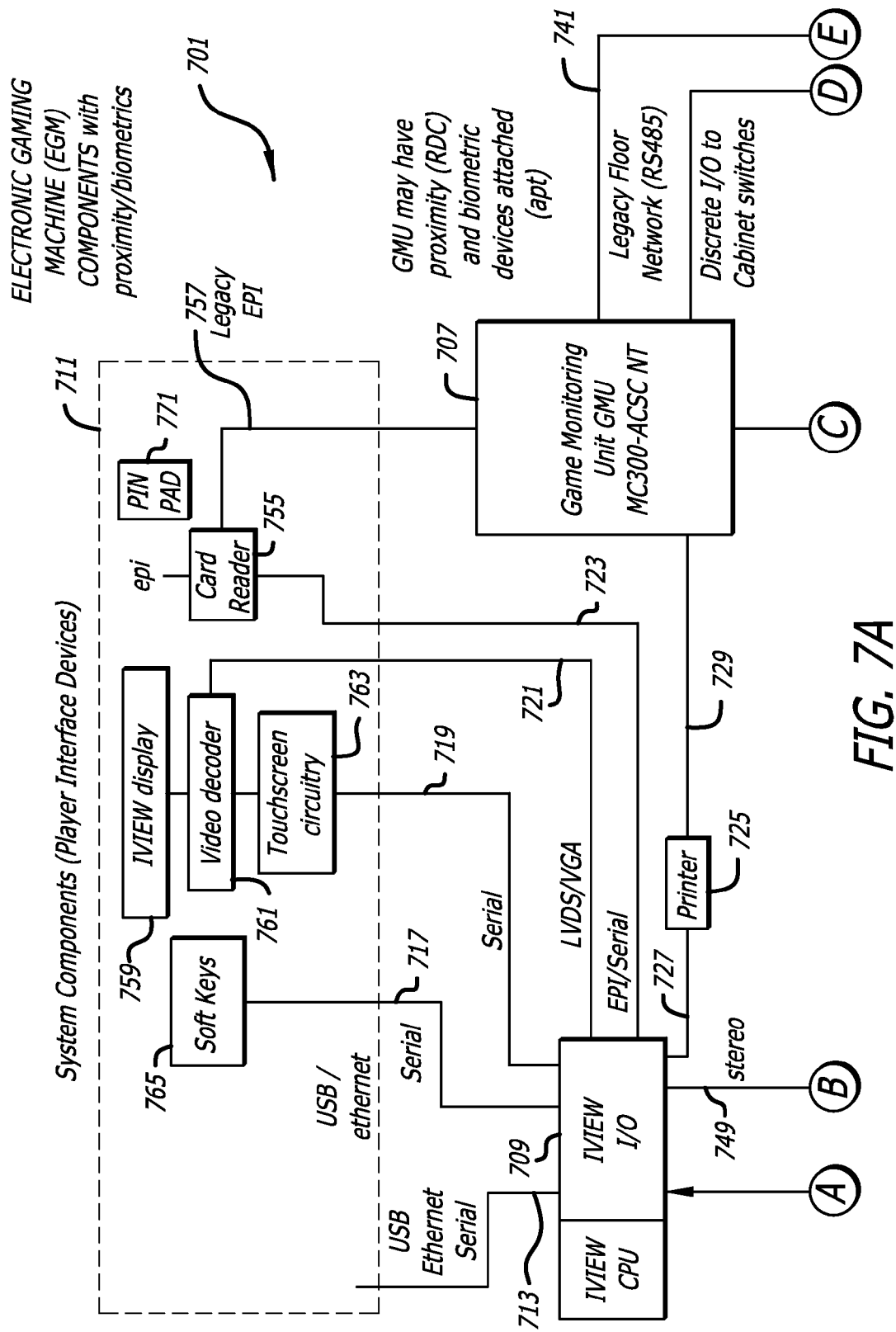
FIG. 7A illustrates a block diagram of the physical and logical components of the gaming machine of FIG. 1 in accordance with one or more embodiments.
Figure 7B:
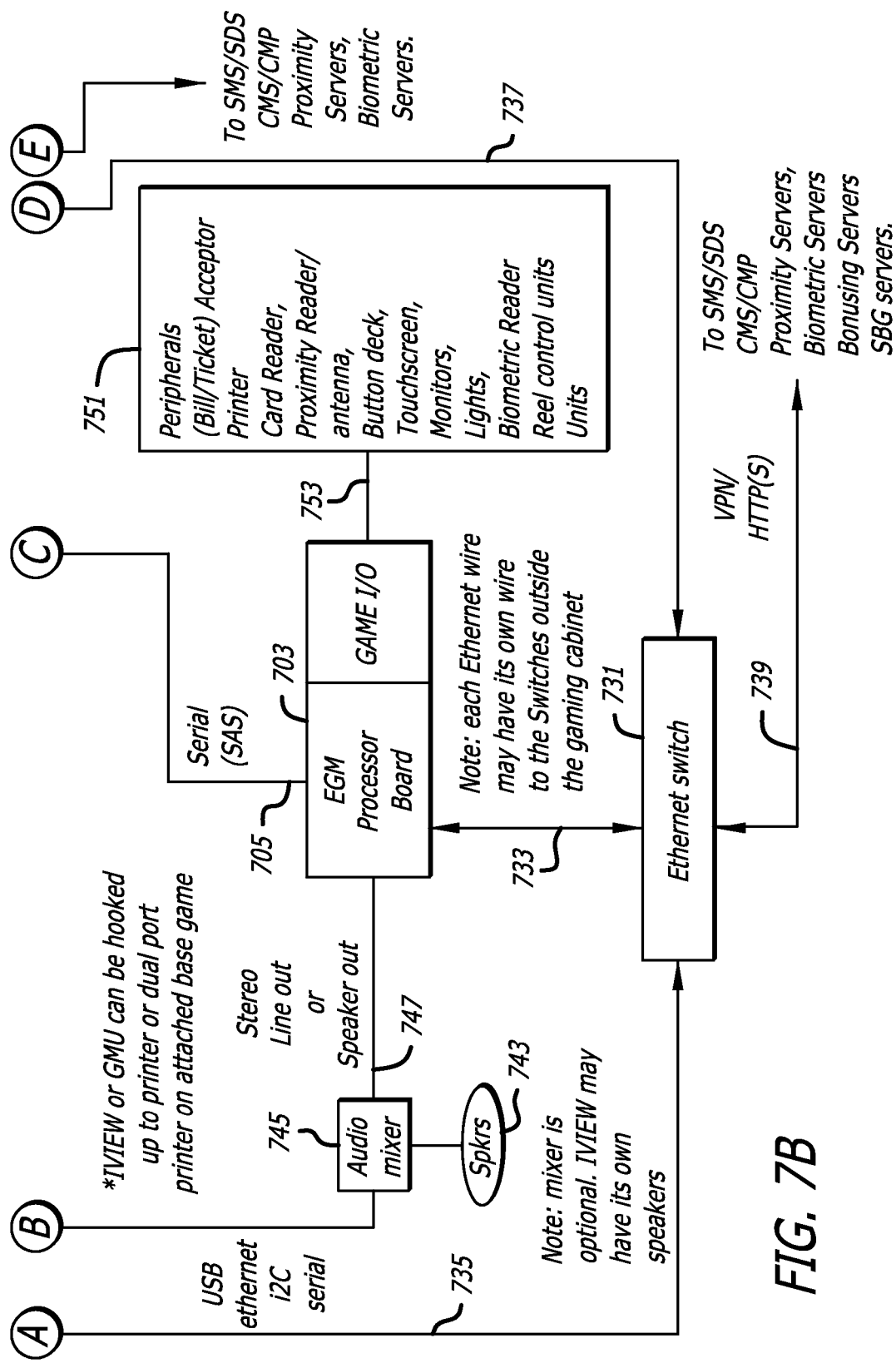
FIG. 7B illustrates a block diagram of the physical and logical components of the gaming machine of FIG. 1 in accordance with one or more embodiments.

Referring to FIGS. 7A and 7B, electronic gaming machine 701 is shown in accordance with one or more embodiments. Electronic gaming machine 701 includes base game integrated circuit board 703 (EGM Processor Board) connected through serial bus line 705 to game monitoring unit (GMU) 707 (such as a Bally MC300 or ACSC NT), and player interface integrated circuit board (PIB) 709 connected to player interface devices 711 over bus lines 713, 715, 717, 719, 721, 723. Printer 725 is connected to PIB 709 and GMU 707 over bus lines 727, 729. Base game integrated circuit board 703, PIB 709, and GMU 707 connect to Ethernet switch 731 over bus lines 733, 735, 737. Ethernet switch 731 connects to a slot management system (SMS) and a casino management system (CMS) network over bus line 739. GMU 707 also may connect to the SMS and CMS network over bus line 741. Speakers 743 connect through audio mixer 745 and bus lines 747, 749 to base game integrated circuit board 703 and PIB 709. The proximity and biometric devices and circuitry may be installed by upgrading a commercially available PIB 709, such as a Bally iView™ unit. Coding executed on base game integrated circuit board 703, PIB 709, and/or GMU 707 may be upgraded to integrate a game in accordance with one or more embodiments of the invention described herein, as is more fully described below.

Peripherals 751 connect through I/O board 753 to base game integrated circuit board 703. For example, a bill/ticket acceptor is typically connected to a game input-output board 753 which is, in turn, connected to a conventional central processing unit ("CPU") base game integrated circuit board 703, such as an Intel Pentium microprocessor mounted on a gaming motherboard. I/O board 753 may be connected to base game integrated circuit board 703 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 703 executes a game program that causes base game integrated circuit board 703 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 753 to base game integrated circuit board 703 which, in turn, assigns an appropriate number of credits for play in accordance with the game program. The player may further control the operation of the gaming machine by way of other peripherals 751, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 700; for example, it may be part of a central determination host system which provides random game outcomes to the game program. Thereafter, the player may or may not interact with the game through electromechanical or touch screen buttons to change the displayed indicia. Finally, base game integrated circuit board 703 under control of the game program and OS compares the final display of indicia to a pay table. The set of possible game outcomes may include a subset of outcomes related to the triggering of a feature game. In the event the displayed outcome is a member of this subset, base game integrated circuit board 703, under control of the game program and by way of I/O Board 753, may cause feature game play to be presented on a feature display.

Predetermined payout amounts for certain outcomes, including feature game outcomes, are stored as part of the game program. Such payout amounts are, in response to instructions from base game integrated circuit board 703, provided to the player in the form of coins, credits or currency via I/O board 753 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 707 includes an integrated circuit board and GMU processor and memory including coding for network communications, such as the G2S (game-to-system) protocol from the Gaming Standards Association, Las Vegas, Nev., used for system communications over the network. As shown, GMU 707 may connect to card reader 755 through bus 757 and may thereby obtain player card information and transmit the information over the network through bus 741. Gaming activity information may be transferred by the base game integrated circuit board 703 to GMU 707 where the information may be translated into a network protocol, such as S2S, for transmission to a server, such as a player tracking server, where information about a player's playing activity may be stored in a designated server database.

PIB 709 includes an integrated circuit board, PID processor, and memory which includes an operating system, such as Windows CE, a player interface program which may be executable by the PID processor together with various input/output (I/O) drivers for respective devices which connect to PIB 709, such as player interface devices 711, and which may further include various games or game components playable on PIB 709 or playable on a connected network server and PIB 709 is operable as the player interface. PIB 709 connects to card reader 755 through bus 723, display 759 through video decoder 761 and bus 721, such as an LVDS or VGA bus.

As part of its programming, the PID processor executes coding to drive display 759 and provide messages and information to a player. Touch screen circuitry interactively connects display 759 and video decoder 761 to PIB 709, such that a player may input information and cause the information to be transmitted to PIB 709 either on the player's initiative or responsive to a query by PIB 709. Additionally soft keys 765 connect through bus 717 to PIB 709 and operate together with display 759 to provide information or queries to a player and receive responses or queries from the player. PIB 709, in turn, communicates over the CMS/SMS network through Ethernet switch 731 and busses 735, 739 and with respective servers, such as a player tracking server.

Player interface devices 711 are linked into the virtual private network of the system components in gaming machine 701. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView™ processing board and game monitoring unit (GMU) processing board. The GMU and iView™ can be combined into one like the commercially available Bally G™ iView device. This device may have a video mixing technology to mix the EGM processor's video signals with the iView display onto the top box monitor or any monitor on the gaming device.

Figure 8:
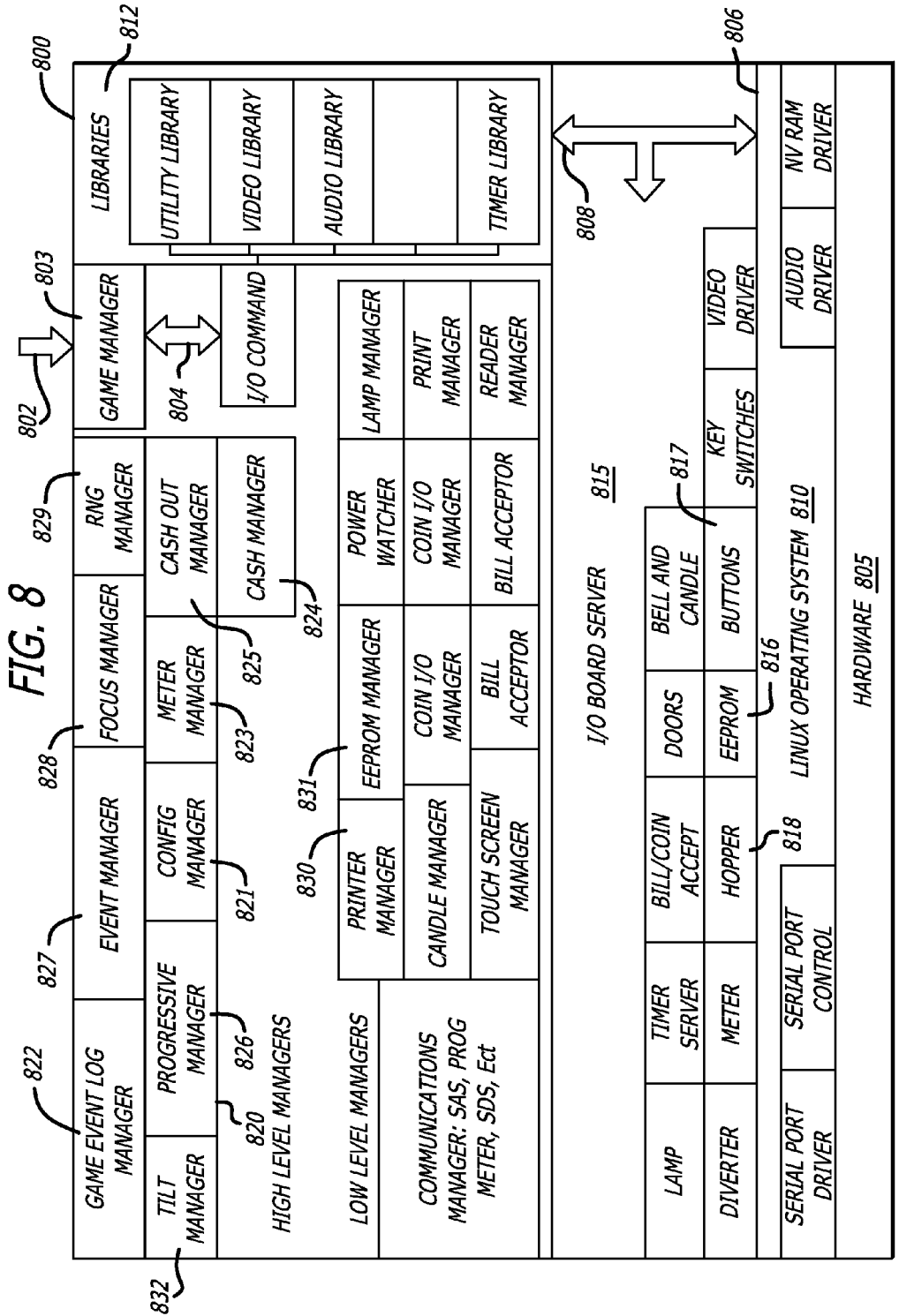
FIG. 8 illustrates a block diagram of the logical components of a gaming kernel in accordance with one or more embodiments.

In accordance with one or more embodiments, FIG. 8 is a functional block diagram of a gaming kernel 800 of a game program under control of base game integrated circuit board 803. The game program uses gaming kernel 800 by calling into application programming interface (API) 802, which is part of game manager 803. The components of game kernel 800 as shown in FIG. 8 are only illustrative, and should not be considered limiting. For example, the number of managers may be changed, additional managers may be added or some managers may be removed without deviating from the scope and spirit of the invention.

As shown in the example, there are three layers: a hardware layer 805; an operating system layer 810, such as, but not limited to, Linux; and a game kernel layer 800 having game manager 803 therein. In one or more embodiments, the use of a standard operating system 810, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 800 executes at the user level of the operating system 810, and itself contains a major component called the I/O Board Server 815. To properly set the bounds of game application software (making integrity checking easier), all game applications interact with gaming kernel 800 using a single API 802 in game manager 803. This enables game applications to make use of a well-defined, consistent interface, as well as making access points to gaming kernel 800 controlled, where overall access is controlled using separate processes.

For example, game manager 803 parses an incoming command stream and, when a command dealing with I/O comes in (arrow 804), the command is sent to an applicable library routine 812. Library routine 812 decides what it needs from a device, and sends commands to I/O Board Server 815 (see arrow 808). A few specific drivers remain in operating system 810's kernel, shown as those below line 806. These are built-in, primitive, or privileged drivers that are (i) general (ii) kept to a minimum and (iii) are easier to leave than extract. In such cases, the low-level communication is handled within operating system 810 and the contents passed to library routines 812.

Thus, in a few cases library routines may interact with drivers inside operating system 810, which is why arrow 808 is shown as having three directions (between library utilities 812 and I/O Board Server 815, or between library utilities 812 and certain drivers in operating system 810). No matter which path is taken, the logic needed to work with each device is coded into modules in the user layer of the diagram. Operating system 810 is kept as simple, stripped down, and common across as many hardware platforms as possible. The library utilities and user-level drivers change as dictated by the game cabinet or game machine in which it will run. Thus, each game cabinet or game machine may have a base game integrated circuit board 803 connected to a unique, relatively dumb, and as inexpensive as possible I/O adapter board 840, plus a gaming kernel 800 which will have the game-machine-unique library routines and I/O Board Server 815 components needed to enable game applications to interact with the gaming machine cabinet. Note that these differences are invisible to the game application software with the exception of certain functional differences (i.e., if a gaming cabinet has stereo sound, the game application will be able make use of API 802 to use the capability over that of a cabinet having traditional monaural sound).

Game manager 803 provides an interface into game kernel 800, providing consistent, predictable, and backwards compatible calling methods, syntax, and capabilities by way of game application API 802. This enables the game developer to be free of dealing directly with the hardware, including the freedom to not have to deal with low-level drivers as well as the freedom to not have to program lower level managers 830, although lower level managers 830 may be accessible through game manager 803's interface 802 if a programmer has the need. In addition to the freedom derived from not having to deal with the hardware level drivers and the freedom of having consistent, callable, object-oriented interfaces to software managers of those components (drivers), game manager 803 provides access to a set of upper level managers 820 also having the advantages of consistent callable, object-oriented interfaces, and further providing the types and kinds of base functionality required in casino-type games. Game manager 803, providing all the advantages of its consistent and richly functional interface 802 as supported by the rest of game kernel 800, thus provides a game developer with a multitude of advantages.

Game manager 803 may have several objects within itself, including an initialization object (not shown). The initialization object performs the initialization of the entire game machine, including other objects, after game manager 803 has started its internal objects and servers in appropriate order. In order to carry out this function, the kernel's configuration manager 821 is among the first objects to be started; configuration manager 821 has data needed to initialize and correctly configure other objects or servers.

The upper level managers 820 of game kernel 800 may include game event log manager 822 which provides, at the least, a logging or logger base class, enabling other logging objects to be derived from this base object. The logger object is a generic logger; that is, it is not aware of the contents of logged messages and events. The log manager's (822) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 823 manages the various meters embodied in the game kernel 800. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 823 receives its initialization data for the meters, during start-up, from configuration manager 821. While running, the cash in (824) and cash out (825) managers call the meter manager's (823) update functions to update the meters. Meter manager 823 will, on occasion, create backup copies of the soft meters by storing the soft meters' readings in EEPROM. This is accomplished by calling and using EEPROM manager 831.

In accordance with still other embodiments, progressive manager 826 manages progressive games playable from the game machine. Event manager 827 is generic, like log manager 822, and is used to manage various gaming machine events. Focus manager 828 correlates which process has control of various focus items. Tilt manager 832 is an object that receives a list of errors (if any) from configuration manager 821 at initialization, and during game play from processes, managers, drivers, etc. that may generate errors. Random number generator manager 829 is provided to allow easy programming access to a random number generator (RNG), as a RNG is required in virtually all casino-style (gambling) games. RNG manager 829 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 825 has the responsibility of configuring and managing monetary output devices. During initialization, cash out manager 825, using data from configuration manager 821, sets the cash out devices correctly and selects any selectable cash out denominations. During play, a game application may post a cash out event through the event manager 827 (the same way all events are handled), and using a call-back posted by cash out manager 825, cash out manager 825 is informed of the event. Cash out manager 825 updates the credit object, updates its state in non-volatile memory, and sends an appropriate control message to the device manager that corresponds to the dispensing device. As the device dispenses dispensable media, there will typically be event messages being sent back and forth between the device and cash out manager 825 until the dispensing finishes, after which cash out manager 825, having updated the credit manager and any other game state (such as some associated with meter manager 823) that needs to be updated for this set of actions, sends a cash out completion event to event manager 827 and to the game application thereby. Cash in manager 824 functions similarly to cash out manager 825, only controlling, interfacing with, and taking care of actions associated with cashing in events, cash in devices, and associated meters and crediting.

In a further example, in accordance with one or more embodiments, I/O server 815 may write data to the gaming machine EEPROM memory, which is located in the gaming machine cabinet and holds meter storage that must be kept even in the event of power failure. Game manager 803 calls the I/O library functions to write data to the EEPROM. The I/O server 815 receives the request and starts a low priority EEPROM thread 816 within I/O server 815 to write the data. This thread uses a sequence of 8 bit command and data writes to the EEPROM device to write the appropriate data in the proper location within the device. Any errors detected will be sent as IPC messages to game manager 803. All of this processing is asynchronous.

In accordance with one embodiment, button module 817 within I/O server 815, polls (or is sent) the state of buttons every 2 ms. These inputs are debounced by keeping a history of input samples. Certain sequences of samples are required to detect a button was pressed, in which case the I/O server 815 sends an inter-process communication event to game manager 803 that a button was pressed or released. In some embodiments, the gaming machine may have intelligent distributed I/O which debounces the buttons, in which case button module 817 may be able to communicate with the remote intelligent button processor to get the button events and simply relay them to game manager 803 via IPC messages. In still another embodiment, the I/O library may be used for pay out requests from the game application. For example, hopper module 818 must start the hopper motor, constantly monitor the coin sensing lines of the hopper, debounce them, and send an IPC message to the game manager 803 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 9A:
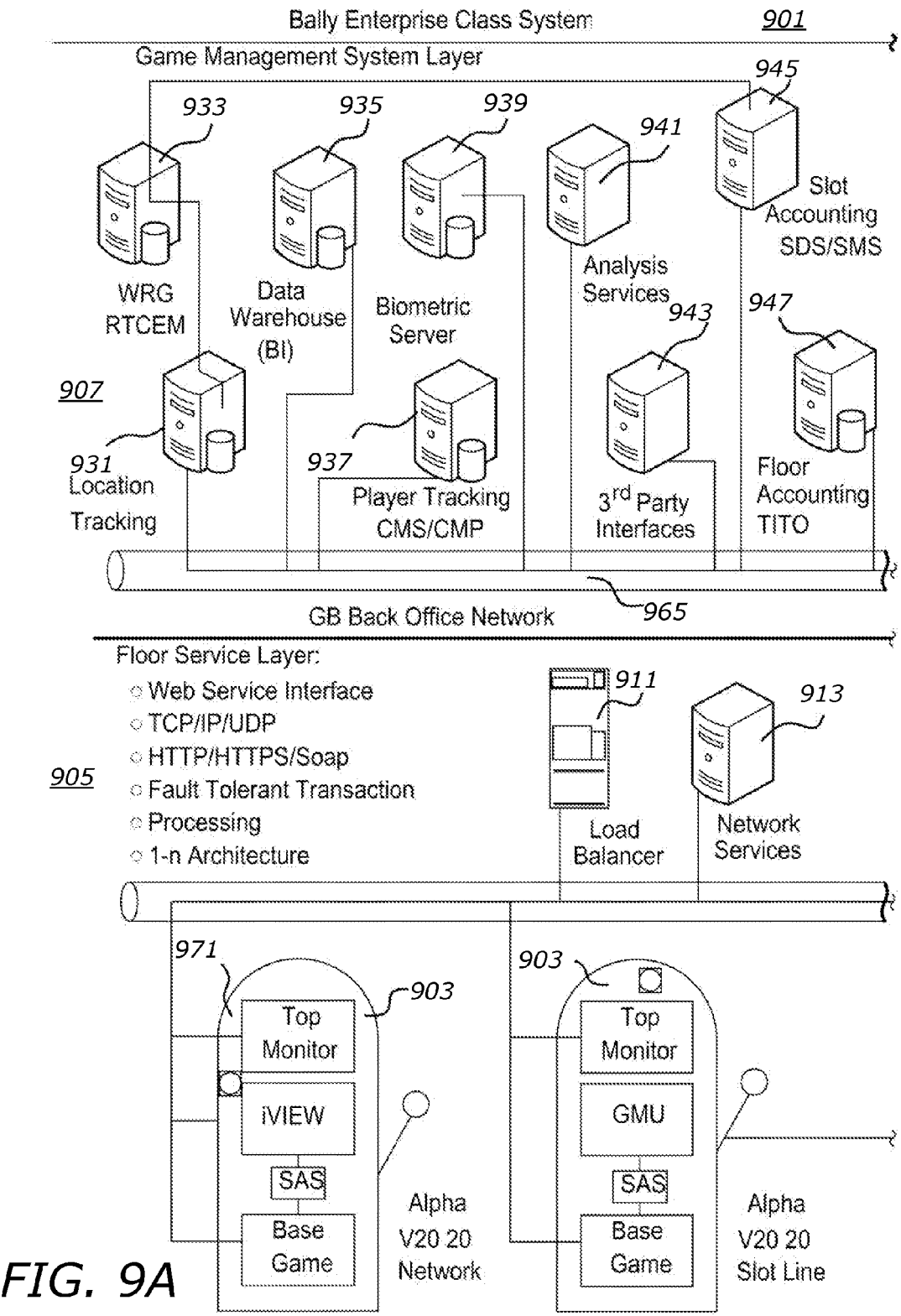
FIG. 9A illustrates a schematic block diagram showing the hardware elements of a networked gaming system in accordance with one or more embodiments.
Figure 9B:
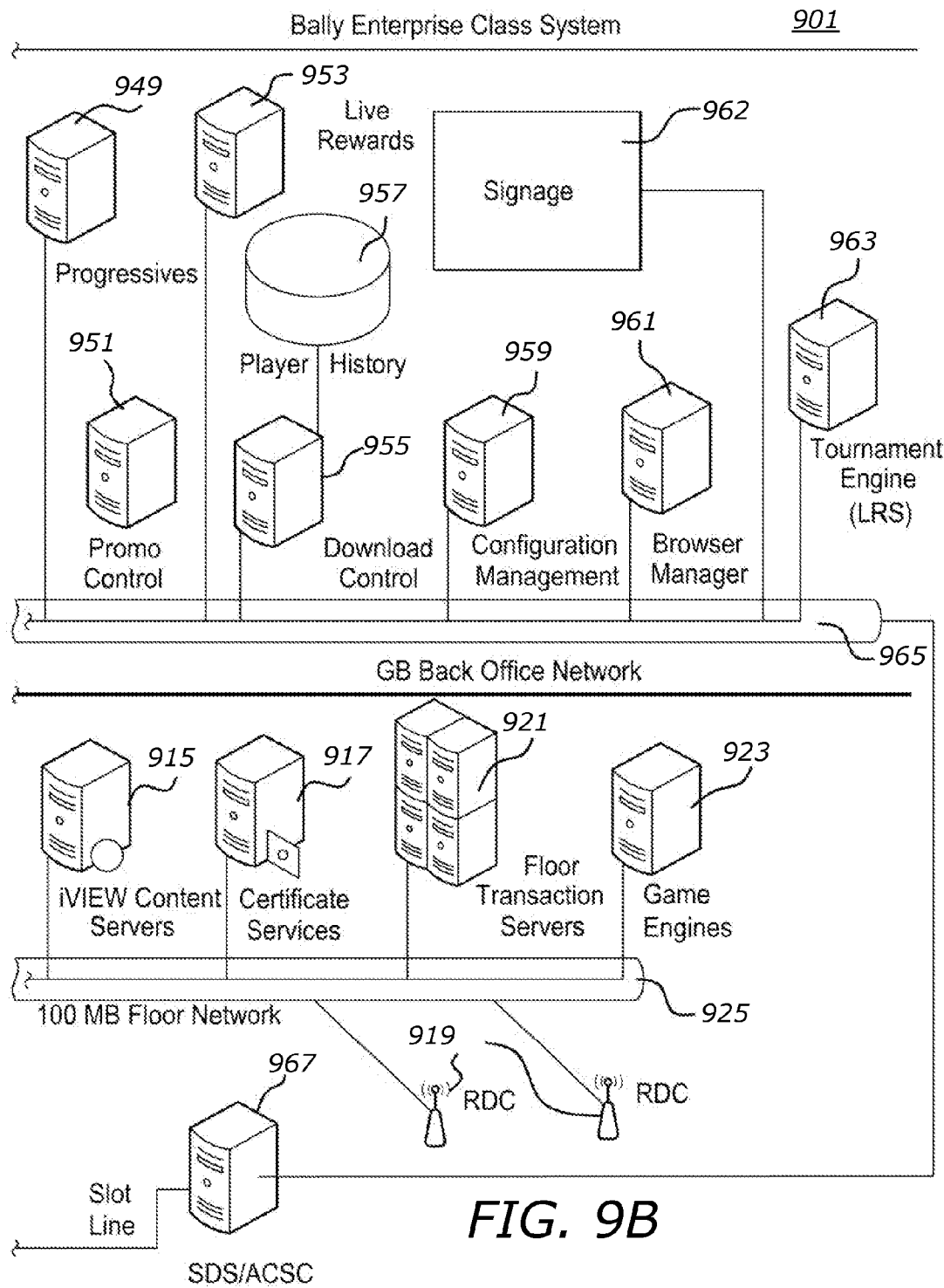
FIG. 9B illustrates a schematic block diagram showing the hardware elements of a networked gaming system in accordance with one or more embodiments.

Referring to FIGS. 9A and 9B, enterprise gaming system 901 is shown in accordance with one or more embodiments. Enterprise gaming system 901 may include one casino or multiple locations and generally includes a network of gaming machines 903, floor management system (SMS) 905, and casino management system (CMS) 907. SMS 905 may include load balancer 911, network services servers 913, player interface (iView) content servers 915, certificate services server 917, floor radio dispatch receiver/transmitters (RDC) 919, floor transaction servers 921 and game engines 923, each of which may connect over network bus 925 to gaming machines 903. CMS 907 may include location tracking server 931, WRG RTCEM server 933, data warehouse server 935, player tracking server 937, biometric server 939, analysis services server 941, third party interface server 943, slot accounting server 945, floor accounting server 947, progressives server 949, promo control server 951, feature game (such as Bally Live Rewards) server 953, download control server 955, player history database 957, configuration management server 959, browser manager 991, tournament engine server 963 connecting through bus 965 to server host 967 and gaming machines 903. The various servers and gaming machines 903 may connect to the network with various conventional network connections (such as, for example, USB, serial, parallel, RS485, Ethernet). Additional servers which may be incorporated with CMS 907 include a responsible gaming limit server (not shown), advertisement server (not shown), and a control station server (not shown) where an operator or authorized personnel may select options and input new programming to adjust each of the respective servers and gaming machines 903. SMS 905 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 903 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 907 and/or SMS 905 servers and devices, firmware, media, operating systems, and configurations may be downloaded to the system components of respective gaming machines for upgrading or managing floor content and offerings in accordance with operator selections or automatically depending upon CMS 907 and SMS 905 master programming. The data and programming updates to gaming machines 903 are authenticated using conventional techniques prior to install on the system components.

In various embodiments, any of the gaming machines 903 may be a mechanical reel spinning slot machine or a video slot machine or a gaming machine offering one or more of the above described games including a group play game. Alternately, gaming machines 903 may provide a game with a simulated musical instrument interface as a primary or base game or as one of a set of multiple primary games selected for play by a random number generator. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Patent Publication No. 20080139305, entitled "Networked System and Method for Group Play Gaming," filed on Nov. 9, 2007, which is hereby incorporated by reference in its entirety for all purposes.

Figure 10:
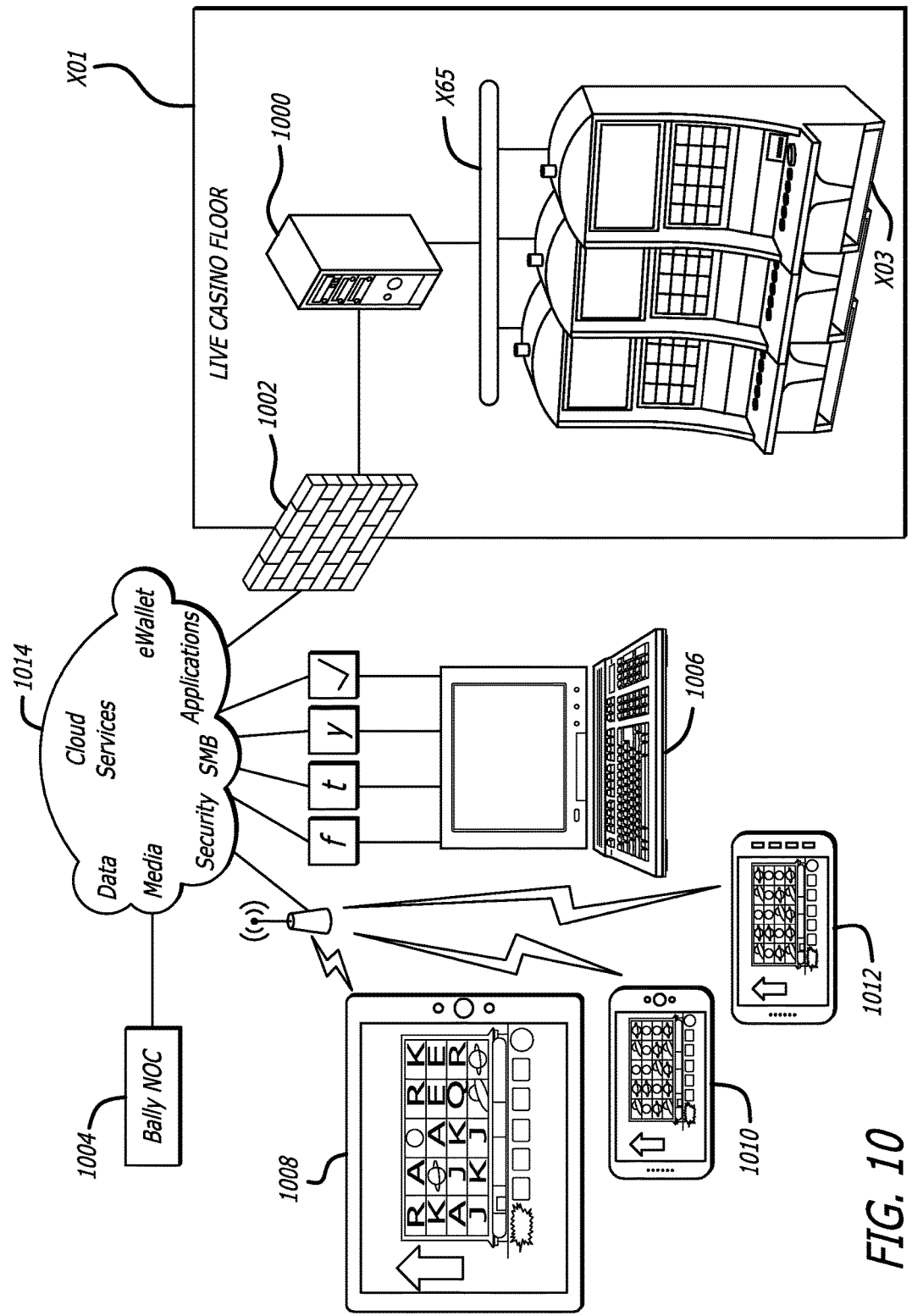
FIG. 10 illustrates a diagram showing an example of architecture for tying a casino enterprise network to an external provider of games and content to Internet or broadband communication capable devices.

All or portions of the present invention may also be implemented or promoted by or through a system as suggested in FIG. 10. At 901 is the gaming system of FIGS. 9A and 9B, which may be hosted at a casino property enterprise, across several casino enterprises or by a third party host. As described above, the gaming system 901 has a network communication bus 965 providing for communication between the gaming terminals 903 and various servers. To provide the functionality illustrated in FIG. 10, a bonusing server 1000, such as a Bally Elite Bonusing Server is connected to the network communication bus 965 (FIGS. 9A and 9B) for communication to the gaming system 901, the gaming terminals 903 and the various servers and other devices as described above. Through a secure network firewall 1002 the bonusing server 1000 is in communication with a cloud computing/storage service 1004 which may be hosted by the casino enterprise, a licensed third party or if permitted by gaming regulators an unlicensed provider. For example the cloud service 1004 may be as provided by Microsoft® Private Cloud Solutions offered by Microsoft Corp. of Redmond, Wash., USA.

The cloud service 1004 provides various applications which can be accessed and delivered to, for example, personal computers 1006, portable computing devices such as computer tablets 1008, personal digital assistants (PDAs) 1010 and cellular devices 1012 such as telephones and smart phones. As but an example, the cloud service 1004 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 1004 includes security provided for secure communications with the cloud service 1004 between the player/users and the cloud service 1004 and between the cloud service 1004 and the gaming system 901. Security applications may be through encryption, the use of personal identification numbers (PINS) or other devices and systems. As suggested in FIG. 10, the cloud service 1014 stores player/user data retrieved from players/users and from the gaming system 901.

The players/users may access the cloud service 1004 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the present invention. At their smart phone 1012 the player/user sends a request to the cloud service 1004 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 1004 forwards the inquiry to the bonusing servicer 1000 which, in turn, confirms the PIN and retrieves the requested information from the data warehouse 935 (FIGS. 9A and 9B) or player tracking CMS/CMP server 937 (FIGS. 9A and 9B). Alternatively the data may be stored in the cloud service 1004 and routinely updated from the data warehouse 935 or player tracking CMS/CMP server 937. In this instance the request would be responded to from data residing with the cloud service 1004. The information is formatted by the cloud server 1004 application and delivered to the player/user. The delivery may be formatted based upon the player/user's device operating system (OS), display size or the like.

The cloud service 1000 may also host game applications to provide virtual instances of games for free, promotional, or where permitted, P2P (Pay to Play) supported gaming. Third party developers may also have access to placing applications with the cloud service 1004 through, for example a national operations center (Bally NOC 1014). A game software manufacturer such as Bally Gaming, Inc. may also provide game applications on its own or on behalf of the casino enterprise.

Other media such as advertising, notices (such as an upcoming tournament) may also be provided to the cloud service 1004. When a player/user accesses the cloud service 1004 certain media may be delivered to the player/user in a manner formatted for their application and device.

While the embodiment described relates to a Baccarat game it should be understood that the inventive concept could be applied to other games particularly those where inter-play player decisions are not required. For example, a slot machine, either electro-mechanical or video may operate one or more virtual games in the background and routinely report an outcome history to the player playing the primary, displayed, version of the game. The player may then compare the histories to the primary game and choose to instead play one of the one or more virtual background versions of the game. Each game version may operate from a differently seeded random number generator so the results (and histories may differ).

Still further the histories may be displayed at a window to either side, above or below the primary game version being wagered upon and played by the player or in a scrolling, ticker display again above or below or to either side of the primary game display. In such a fashion the player may view the histories and select a version of the game which the player may feel is "hotter" and is having better outcomes.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed:

1. A system for providing access to at least first interactive content or second interactive content by a user of a portable computing device based upon a determined location of the portable computing device, the portable computing device having communication functionality, the system comprising:
    a host server;
    a content server storing data representing the first interactive content and the second interactive content;
    a communication network in communication with the host server and the content server;
    one or more communication beacons in communication with the host server through the communication network, the communication network configured to establish communication with the portable computing device, wherein a location of the portable computing device is determined by scanning for a strongest signal strength from fixed geographic locations of the communication beacons;
    the host server configured to control the content server and enable the portable computing device to display the first interactive content when the portable computing device is determined to be in a first location and to display the second interactive content when the portable computing device is determined to be in a second location,
    wherein the portable computing device implements a first unique interaction method in the first location and implements a second unique interaction method in the second location wherein the first unique player interaction method is a touchscreen interface, and wherein the second unique player interaction method enables pitch, roll, and yaw input capabilities.

2. The system of claim 1, wherein the portable computing device's position is determined using WiFi trilateration.

3. The system of claim 1, wherein the portable computing device's position is determined using proximity, RSSI, and fixed geographic location of a transmitting device.

4. The system of claim 1, wherein the first interactive content is a game played using a first type of player input on the portable computing device.

5. The system of claim 1, wherein the second interactive content is a game played using a second type of player input on the portable computing device.

6. The system of claim 5, wherein the second type of player input includes gyroscopic directed input that is detected by a gyroscope in the portable computing device.

7. The system of claim 1, wherein the host server is configured to define one or more virtual geo-fences that prevent one or more of the first interactive content and the second interactive content from being displayed on the portable computing device.

8. The system of claim 1, wherein the first location and the second location have demographic characteristics, and wherein the host server is configured to provide the first interactive content based upon identifying the demographic characteristic of the first location and provide the second interactive content based upon identifying the demographic characteristic of the second location.

9. A method of delivering at least first interactive content and second interactive content to a portable computing device based upon a location of the portable computing device, the portable computing device including communication functionality, the method comprising:
    transmitting communication beacon signals from a portable computing device and transmitting communication beacon signals from a plurality of beacons;
    establishing communication between the portable computing device and the plurality of beacons using the transmitted communication beacon signals;
    by scanning for a strongest signal strength from fixed geographic locations of the communication beacons, deriving from the communication, using a processor, a location of the portable computing device within one of a first location having first demographic characteristics and a second location having second demographic characteristics; and
    configuring a server for providing to said portable device said first interactive content when the portable device is determined to be in said first location and said second interactive content when said portable device is determined to be in said second location,
    wherein the portable computing device implements a first unique interaction method in the first location and implements a second unique interaction method in the second location wherein the first unique player interaction method is a touchscreen interface, and wherein the second unique player interaction method enables pitch, roll, and yaw input capabilities.

10. A system for providing access to first interactive content or second interactive content by a user of a portable computing device based upon a determined location of the portable computing device, the portable computing device having communication functionality, the system comprising:

a communication network;
a host server;
a fixed-location gaming device for presenting a game of chance for one or more players, wherein the fixed-location gaming device includes a fixed-location game display configured to display game play and game outcome;
one or more communication beacons in communication with the host server through the communication network, the communication network is configured to establish communication with the portable computing device, the host server configured to determine a location of the portable computing device from the communication of the portable computing device with the communication network by scanning for a strongest signal strength from fixed geographic locations of the communication beacons;
the portable computing device including a processor and memory configured to execute the game of chance, wherein the portable computing device further includes a portable display, the first interactive content displaying only a wagering interface on the portable display when a location of the portable computing device is determined to position the player to view the fixed-location game display, and the second interactive content displaying a wagering interface and the game of chance when the location of the portable computing device is determined to be in a location where the fixed-location game display cannot be viewed by the player.
wherein the portable computing device implements a first unique interaction method in the first location and implements a second unique interaction method in the second location wherein the first unique player interaction method is a touchscreen interface, and wherein the second unique player interaction method enables pitch, roll, and yaw input capabilities.

11. The system of claim 10, wherein the gaming device is a gaming table hosting a live table game, and wherein the gaming device includes a camera that is configured to capture at least a play phase and an award phase.

12. The system of claim 10, wherein the gaming device is an electronic table game.

13. The system of claim 10, wherein the portable computing device's position is determined using WiFi trilateration.

14. The system of claim 10, wherein the portable computing device's position is determined using proximity, RSSI, and fixed geographic location of a transmitting device.

15. The system of claim 10, wherein the first interactive content is a game played using a first type of player input on the portable computing device.

16. The system of claim 10, wherein the second interactive content is a game played using a second type of player input on the portable computing device.

17. The system of claim 16, wherein the second type of player input includes gyroscopic directed input that is detected by a gyroscope in the portable computing device.

18. The system of claim 10, wherein the host server is configured to define one or more virtual geo-fences that prevent one or more of the first interactive content and the second interactive content from being displayed on the portable computing device.

19. The system of claim 10, wherein the first location and the second location have demographic characteristics, and wherein the host server is configured to provide the first interactive content based upon identifying the demographic characteristic of the first location and provide the second interactive content based upon identifying the demographic characteristic of the second location.

20. A method of delivering at least first interactive content and second interactive content to a portable computing device based upon a location of the portable computing device, the portable computing device including communication functionality, the method comprising:
transmitting communication beacon signals from a plurality of beacons;
establishing communication between the portable computing device and the plurality of beacons using the transmitted communication beacon signals;
by scanning for a strongest signal strength from fixed geographic locations of the communication beacons, deriving from the communication, using a processor, a location of the portable computing device within one of a first location having first demographic characteristics and a second location having second demographic characteristics; and
configuring a server for providing to said portable device said first interactive content when the portable device is determined to be in said first location and said second interactive content when said portable device is determined to be in said second location,
wherein the portable computing device implements a first unique interaction method in the first location and implements a second unique interaction method in the second location wherein the first unique player interaction method is a touchscreen interface, and wherein the second unique player interaction method enables pitch, roll, and yaw input capabilities.

21. The system of claim 1, wherein the content server additionally stores data representing the third interactive content, and wherein the portable computing device displays the third interactive content when the portable computing device is determined to be in a third location.

22. The system of claim 21, wherein the content server additionally stores data representing the forth interactive content, and wherein the portable computing device displays the forth interactive content when the portable computing device is determined to be in a forth location.

* * * * *